United States Patent [19]
Leonhardt

[11] Patent Number: 6,101,920
[45] Date of Patent: Aug. 15, 2000

[54] PNEUMATIC OR HYDRAULIC CYLINDER WITH PISTON POSITION DETECTOR MOUNTED IN LONGITUDINAL GROOVE IN CYLINDER TUBE SURFACE

[75] Inventor: Peter Leonhardt, Altenstadt, Germany

[73] Assignee: Hygrama AG, Rotkreuz, Switzerland

[21] Appl. No.: 09/056,822

[22] Filed: Apr. 8, 1998

[30] Foreign Application Priority Data

Apr. 8, 1997 [AT] Austria ........................................ 586/97

[51] Int. Cl.⁷ .................................................... F01B 25/26
[52] U.S. Cl. ............................................. 92/5 R; 403/381
[58] Field of Search ................. 91/1; 92/5 R; 403/374.1, 403/374.2, 375, 381, 355

[56] References Cited

U.S. PATENT DOCUMENTS

| | | | |
|---|---|---|---|
| 3,043,411 | 7/1962 | Wyrough | 403/375 X |
| 3,135,164 | 6/1964 | Scotto et al. | 92/5 R X |
| 3,577,316 | 5/1971 | Piette | 403/381 X |
| 3,845,578 | 11/1974 | Holmstrom | 403/375 X |
| 4,086,456 | 4/1978 | Bone | 200/82 E |
| 4,447,171 | 5/1984 | Baldoni et al. | 403/381 |
| 4,504,168 | 3/1985 | Miller | 403/381 X |
| 4,896,584 | 1/1990 | Stoll et al. | 92/5 R |
| 5,222,826 | 6/1993 | Hanke | 403/381 |
| 5,335,587 | 8/1994 | Stoll | 92/5 R X |
| 5,438,911 | 8/1995 | Fielder et al. | 92/5 R |
| 5,813,313 | 9/1998 | Stoll et al. | 92/5 R |

*Primary Examiner*—John E. Ryznic
*Attorney, Agent, or Firm*—Watson Cole Grindle Watson, P.L.L.C.

[57] ABSTRACT

A pneumatic or hydraulic cylinder (1) includes a cylinder tube (3) consisting of a non-ferromagnetic material in which a piston moves. At least one longitudinal channel (9) is recessed in the outer surface of the cylinder tube in which a signal transmitter (8) is secured to scan the piston location without physical contact. A permanent magnet is located on the piston which activates the signal transmitter (8) by its magnetic field. A leaf spring (17) is provided to secure the signal transmitter (8) in the longitudinal channel (9) and is attached to the housing of the signal transmitter by means of a screw (12) and a nut (19) with an inclined surface (20) that moves outward against the wall of the longitudinal channel (9) when the screw is tightened and thus tightly clamps the signal transmitter (8). The attaching device, consisting of the screw (12) with nut (18) and leaf spring (17), and the signal lead (10) are positioned on the same end of the signal transmitter (8).

6 Claims, 2 Drawing Sheets

PNEUMATIC OR HYDRAULIC CYLINDER WITH PISTON POSITION DETECTOR MOUNTED IN LONGITUDINAL GROOVE IN CYLINDER TUBE SURFACE

BACKGROUND OF THE INVENTION

The present invention relates to a pneumatic or hydraulic cylinder formed of a cylinder tube made of non-ferromagnetic material with a movable piston therein and at least one signal transmitter located in one or more longitudinal channels in the cylinder tube and from each of which a signal lead extends for indicating the location of the piston within the cylinder tube, the signal transmitters being secured in the longitudinal grooves by means of screws and detecting the position of the piston in the cylinder tube by detecting the magnetic field of a permanent magnet on the piston.

THE PRIOR ART

It is already known how to indicate the location of the piston in the cylinder tube of pneumatic or hydraulic cylinders of this type without physical contact using a Reed switch or signal transmitters which operate on other electronic principles. To accomplish this, one or several permanent magnets are located on or in the piston of the cylinder and build-up a magnetic field through the non-ferromagnetic cylinder tube. This causes a reciprocal effect on one or more signal transmitters located on the cylinder tube and, according to the strength and extent of the field, a certain response range is produced in which the signal transmitter fulfills a switching function.

Because of the different types of pneumatic or hydraulic cylinders, various methods are known for securing the signal transmitters on the cylinder housings, usually as cylinder covers for the cylinder tube or its ends. In particular, channels of various shapes are placed for this purpose in the cylinder housing, usually dove tail channels or undercut grooves in a T-shape in which the signal transmitters are secured. Various means are used to actually attach the signal transmitters.

In a known example, the signal transmitter engages on one side into a dove tail channel and is held by a hinge elbow covering it with one leg and which engages into the dove tail channel on the other side with the end of the second leg. A tension screw is provided for tightening which presses the leg of the hinge elbow on the side of the signal transmitter away from the signal transmitter and thus tightly clumps it in the dove tail channel. In another known example the signal transmitter is connected to a swiveling metal flange which likewise engages into an undercut channel and can be clamped by swinging it into the groove. In addition, it is also known how to surround a signal transmitter with a profile frame which engages into a dove tail channel and is secured outside the channel by means of a screw on the cylinder housing.

Another known variation is to place a flexible elastomer material, e.g., gum elastic, into a recess on the signal transmitter and to attain clamping in an undercut channel by pressing together the flexible material by means of a screw. Another variant uses a shackle, placed over the signal transmitter, engaging into the dove tail channel with its ends and being tightened against the transmitter and into the channel by a screw. Finally, there are several examples in which the sensitive part of the signal transmitter is contained in a component part, whereby separate securing means are provided which connect to the housing of the signal transmitter by a screw and a second screw is provided which engages into the dove tail channel and thus securely clamps the signal transmitter.

The previously known manner of securing the signal transmitters in the undercut, usually dove-tail shaped channels, has caused many difficulties, as did signal transmitters of different manufacture with varying dimensions and with the widths differing from each other, because, as a rule, the means of attachment required much space. In the previously known versions, it is therefore only possible to position the cable lead for signal capture in an area on the signal transmitter housing where no means of attachment are located, namely, on a signal transmitter secured to one end by a screw and also on the end of the signal transmitter opposite the screw.

Since the sensitive part of the signal transmitter must be located within the area of the cylinder tube and it is difficult to mount the signal transmitter housing in a cover, the known types of construction manifest the disadvantage that the sensitive part of the signal transmitter cannot be placed on the end of the cylinder tube without additional effort. This distance separation results in the position indicator for the piston not scanning the entire stroke of the piston, in particular, its final position. In addition, the known variants and the types of attachment described above require significant effort and are imprecise in part because they can loosen during the temperature variations which occur due to different heat expansion and also because of the shock stresses and impacts. The switching points that were set up are thus not adhered to in a precise manner in the known examples.

The present invention has the object of improving the previously known cylinders with signal transmitters for the indication of piston movements and, in particular, to simplify the attachment of the signal transmitter and make possible its anchoring at any desired location in the channels.

SUMMARY OF THE INVENTION

The object is accomplished by the signal transmitters being firmly clamped in the longitudinal channel by a leaf spring attached to one of their sides and which extends upward against the signal transmitter in a diagonal manner from the end resting in the longitudinal channel and which in its non-tensioned state almost rests on the housing of the signal transmitter and which on its other end is bent inward above the housing of the signal transmitter, whereby the bent end of the leaf spring is passed through by a screw which is supported in a rotatable manner in the housing of the signal transmitter and which has its end screwed into a nut which rests by means of a downward and outward inclined surface on the lower end of the leaf spring and, when the screw is tightened, presses the end of the leaf spring against the side wall of the longitudinal channel. The invention involves what at first appears to be a complicated manner of attaching the signal transmitter, but which fundamentally is a simple embodiment consisting only of a few, a total of three, component parts and which guarantees a secure locking of the signal transmitter in the longitudinal channel.

A preferred embodiment of the invention is possible because of the simple construction in which the screw for the tightening of the leaf spring is placed on one end of the signal transmitter in an offset manner in the direction of a side of the housing and the signal lead is led out of the housing from the same end of the signal transmitter housing to the side of and next to the screw. The attaching parts for clamping the signal transmitter in the longitudinal channel and the signal lead can thus be placed next to each other on the same end because of the small amount of space required for the attachment means, even in a narrow longitudinal groove with a correspondingly narrow housing of the signal transmitter, whereby the entire other end of the signal transmitter is available to accept the entirety of the sensitive part of the same device. The signal transmitter of the invention can then be so mounted in the longitudinal channel that its sensitive end is located in the end area of the cylinder tube with the result that the entire range of the piston stroke can be scanned by the position indicator.

Another advantageous version of the invention consists of the leaf springs incorporating points or cuts on the end resting in the longitudinal channel which penetrate into the side wall of the longitudinal channel during tightening. Since the cylinder tube consists of non-ferromagnetic material, preferably aluminum but possible plastic, this is possible without any additional measures. Despite the simple means of attachment, these measures ensure that the signal transmitter will remain anchored at any desired position in the longitudinal channel, even with only a moderately tightened screw, and will not loosen or move either due to temperature variations or because of the effects of shock stress.

The preferred longitudinal channel in the invention is the previously known dove tail channel into which in the invention an extension on the signal transmitter housing engages on one side and the leaf spring on the other side. It is thereby possible, when the screw is loosened, to insert the signal transmitter and its extension in an inclined manner into any desired location along the longitudinal channel and then swing the side with the leaf spring into the longitudinal channel until the end of the leaf spring on the other side also rests in the longitudinal channel. The signal transmitter can then be securely anchored by merely turning the screw.

By the use of a means of attachment employing a leaf spring which is forcefully spread outward using a screw connection, as envisioned in the invention, an optimal compensation is attained for all dimension differences with respect the width of the longitudinal channel. Another advantage consists of all component parts of the attachment, both the screw with slanted nut as well as the leaf spring, being connected to the signal transmitter housing so that they cannot be lost.

The invention will be better understood by reference to the accompanying drawings taken with the following discussion.

DETAILED DESCRIPTION OF THE PREFERRED EMBODIMENT

Figure 1:
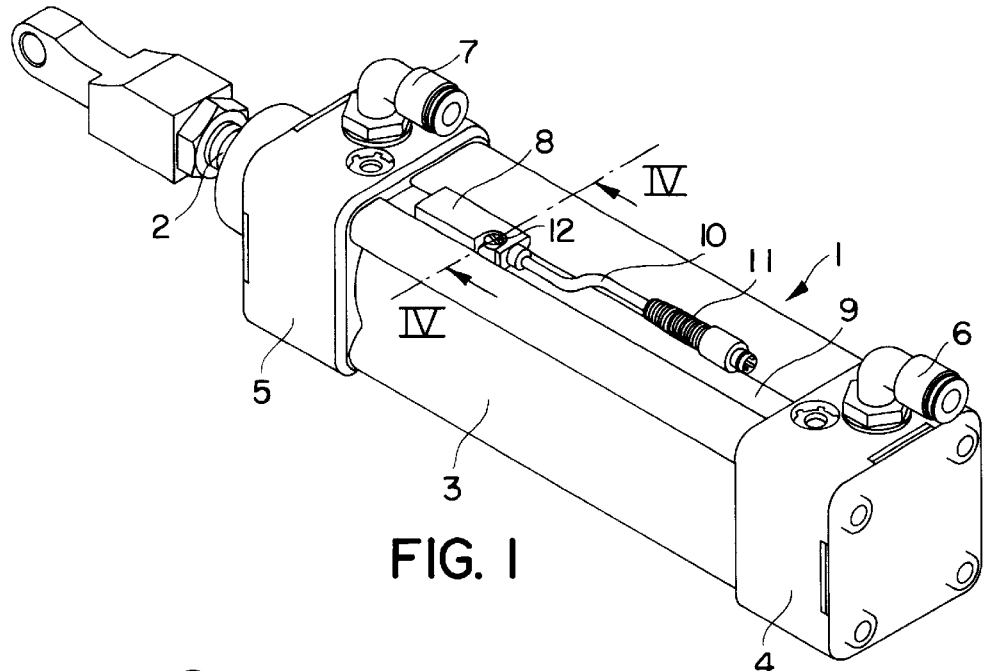
FIG. 1 is a perspective view of a pneumatic or hydraulic cylinder with a mounted signal transmitter in accordance with the present invention.

A pneumatic or hydraulic cylinder 1 which contains a movable piston (not shown) connected to a piston rod 2 is shown in FIG. 1. Cylinder 1 consists of a cylinder tube 3 which is closed on its ends by cylinder covers 4 and 5. The piston rod 2 extends through the cylinder cover 5 in a sealed manner. A connecting piece 6 and 7 is provided on each cylinder cover 4, 5 for the introduction and removal of the pneumatic or hydraulic pressure means to move the piston.

Figure 2:
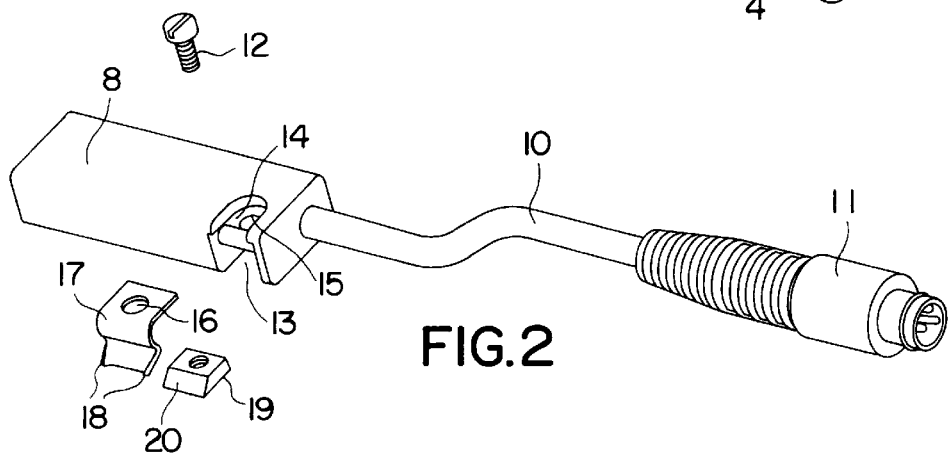
FIG. 2 shows the signal transmitter together with the disassembled component parts of the attaching device in an enlarged, perspective view.
Figure 3:
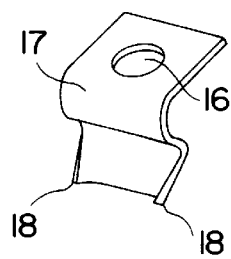
FIG. 3 shows a further enlargement of the leaf spring.

As also can be seen in FIG. 1, a signal transmitter 8 is placed on the cylinder tube 3 for indicating the piston position in the cylinder 1 without physical contact and which is shown in FIG. 2 in a partially disassembled condition. In order to secure the signal transmitter 8 on the cylinder tube 3, the latter is provided with at least one longitudinal channel 9 in which the signal transmitter 8 is inserted and at least partially sunk. It is also possible for several longitudinal channels 9 to be positioned on the outer surface of the cylinder tube 3 and two or more signal transmitters to be placed in each longitudinal channel 9. The longitudinal channels 9 are undercut and preferably manifest a dove tail shape. They can, however, be rectangular, oval or have other shapes. The shapes have the purpose of making it possible so securely anchor the signal transmitters 8 in the longitudinal channel 9, as described below. A signal lead 10 is attached to each signal transmitter 8, so that the signal transmitters 8 can either be directly connected or connected by means of a plug 11, as shown in the depicted embodiment, to an indicator device or to evaluation electronics for sensing the instantaneous position of the piston. A screw 12 can also be seen in FIG. 1 by means of which the signal transmitter 8 is secured in the longitudinal channel 9.

The exact shape of the signal transmitter 8 and its anchoring in the longitudinal channel 9 are shown in FIGS. 2 to 5. It can be seen in FIG. 2 that the signal transmitter 8 is provided with a recess 13 beginning on the side with a counter-sunk seat 14 for the head of the screw 12. The screw 12 passes through a bored hole 15 in the seat 14 and a bored hole 16 in a leaf spring 17 which can be seen in FIG. 2 and which is shown in an enlarged manner in FIG. 3. The section of the leaf spring 17 with the bored hole 16 is bent downward in a generally S-shape along the side of the signal transmitter 8 and terminates with bent sides forming pointed edges. A screw nut 19 can also be seen in FIG. 2 which has an angular surface 20 extending down and outward.

Figure 4:
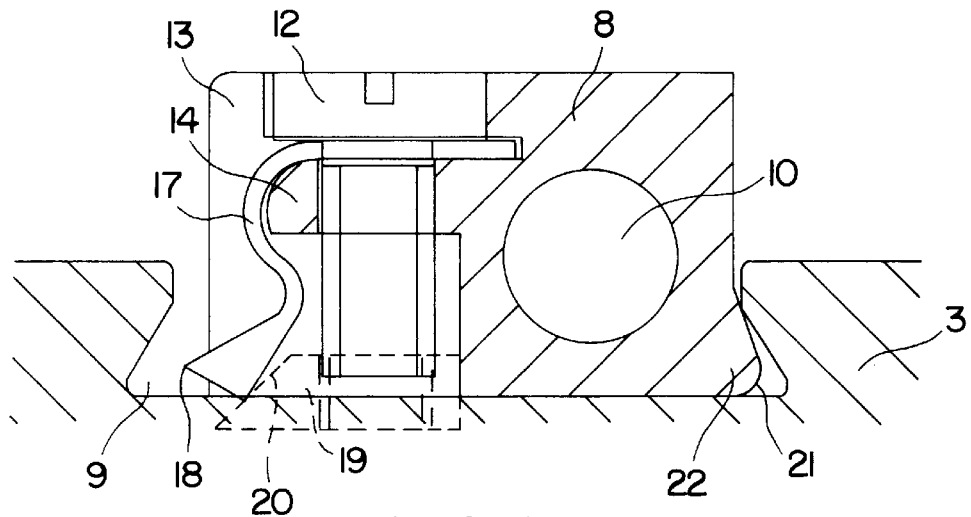
FIGS. 4 and 5 are partial cross sections through the cylinder of FIG. 1 along the line IV—IV, the attaching device for the signal transmitter being shown loosened in FIG. 4 and fully mounted in FIG. 5.
Figure 5:
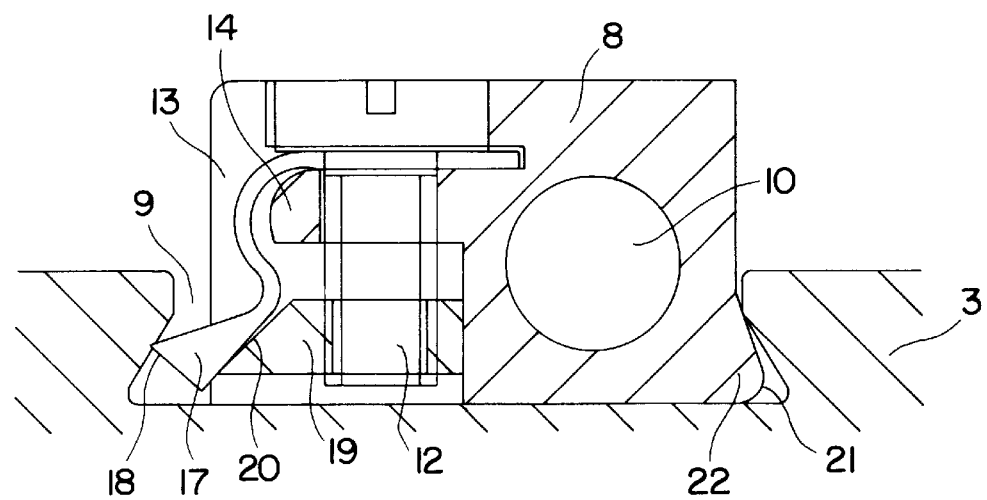

In assembled signal transmitters 8 the upper end of the leaf spring 17 with the bored hole 16 is located between the head of the screw 12 and the seat 14, as seen in FIGS. 4 and 5. According to FIGS. 4 and 5, the threaded end of the screw 12, which passes through bored holes 15 and 16, is screwed into the screw nut 19. The inclined surface 20 rests on the leaf spring 17.

The screw nut 19 is shown by dotted lines in FIG. 4 and the screw 12 is only slightly screwed into the nut 19. In the process the leaf spring 17 is in the swung-in position, resting to a large degree on the side of the signal transmitter 8. It is possible in this position to introduce the signal transmitter 8 with its side edge 21, which is a protruding extension 22 of its housing as shown in the lower right of the figure, into the longitudinal channel and swing counter-clockwise around the side edge 21 as the axis into the longitudinal channel 9, or to swing it clockwise out of it, whereby the pointed edges 18 of the swung-in leaf spring 17 can be swung past the edge of the longitudinal channel 9. If the screw 12 is only slightly screwed into the nut 19, as shown in FIG. 4, the signal transmitter 8 naturally cannot be swung into the final position in the longitudinal channel 9 because the nut 19, shown by means of the dotted line, first strikes the floor of the longitudinal channel 9. When that occurs, the screw 12 must be further screwed into the nut 19. The angular surface 20 of the nut thereby slides upward along the leaf spring 17 and towards the screw head and moves the free end of the leaf spring 17 with the pointed edges 18 outward against the side of the longitudinal channel 9.

FIG. 5 shows the signal transmitter 8 in the final, installed position in the longitudinal channel 9. The nut 19 is thereby drawn so far up because of the tightening of the screw 12 that the pointed edges 18 of the leaf spring 17 penetrate into the material of the signal transmitter 8 housing. The signal transmitter 8 is thereby not only clamped tight in the longitudinal channel 9 cross-wise to its long direction, but also is immovably anchored in the longitudinal direction due to the claw-like gripping of the pointed edges 18 into the material of the housing of the cylinder tube 3.

Because of the configuration described, the signal transmitter 8 of this invention can be introduced into the longitudinal channel 9 and be anchored therein in a simple manner even when the longitudinal channel 9 is sealed on the ends with cylinder covers 4 and 5 and thus is inaccessible in the longitudinal direction. It can also be seen from the figures, in particular FIGS. 4 and 5, that the leaf spring 17 extends only a little beyond one-half of the width of the signal transmitter 8, whereby space remains available on the other half of the signal transmitter 8 for the introduction of the signal lead 10.

The attachment device for the signal transmitter 8, namely the screw 12 with the nut 19 and the leaf spring 17, is located on the same end of the signal transmitter 8 as the signal lead 10. The sensitive and functional component parts of the signal transmitter 8 can therefore be located on the other end of the signal transmitter 8, whereby they are located on the cylinder covers 4, 5 or on the end of the cylinder tube 3. It is thereby possible to scan the entire stroke area of the piston in the cylinder 1 by means of the signal transmitter 8.

As previously mentioned, two or more signal transmitters 8 can be placed in each longitudinal channel 9 or several longitudinal channels 9 can be recessed in the cylinder tube 3 to accept signal transmitters 8, so that it is possible with the configuration of this invention to, in actuality, satisfy all the requirements with regard to scanning the piston movements.

I claim:

1. A pneumatic or hydraulic cylinder comprising a cylinder tube made of a non-ferromagnetic material and containing a movable piston with a permanent magnet, and a signal transmitter which is activated by a magnetic field of the permanent magnet to indicate a location of the piston within the cylinder tube without physical contact, said cylinder tube providing a longitudinal channel in which said signal transmitter is positioned, and said signal transmitter including a signal lead, a housing with a hole therethrough, a leaf spring having a generally S-shaped cross section and opposite first and second ends, a nut with an inclined surface and a screw which passes through said hole in said housing, through said first end of said leaf spring and into said nut, a portion of said leaf spring contacting said housing and said second and extending toward a bottom of said longitudinal channel in a non-tensioned condition, said inclined surface of said nut causing said second end of said leaf spring to become pressed against a side of said longitudinal channel when said screw is rotated to reduce the distance between a head of said screw and said nut and place said leaf spring in a tensioned condition.

2. A cylinder according to claim 1, wherein said screw is placed on one end of the signal transmitter in an offset manner in a direction of one side of the housing and the signal lead extends out of the housing from the same end of the signal transmitter housing to the side of and next to the screw.

3. A cylinder according to claim 1, wherein said second end of said leaf spring includes pointed edges at opposite side thereof which penetrate into the side wall of the longitudinal channel when pressed thereagainst.

4. A cylinder according to claim 1, wherein said longitudinal channel has a dove tail cross section in which an extension of the housing of the signal transmitter engages on one side and the leaf spring on the other side.

5. A cylinder according to claim 1, including a plurality of said signal transmitters in said longitudinal channel.

6. A cylinder according to claim 1, including a plurality of longitudinal channels in said cylinder housing and a plurality of signal transmitters in respective channels.

* * * * *